United States Patent

[11] 3,560,642

[72] Inventors Irvin H. Schroader
Rockville;
Theodore Wyatt, Union Bridge; George B. Bush, Clarksville; Charles J. Swet, Mount Airy, Md.

[21] Appl. No. 675,255
[22] Filed Oct. 13, 1967
[45] Patented Feb. 2, 1971
[73] Assignee the United States of America as represented by the Secretary of the Navy. by mesne assignments

[54] TELEVISION SATELLITE SYSTEM
9 Claims, 4 Drawing Figs.

[52] U.S. Cl. .......... 178/6.8, 178/6
[51] Int. Cl. .......... H04h 5/72
[50] Field of Search .......... 178/6IND, 6LCR; 178/6.8; 244/1

[56] References Cited
UNITED STATES PATENTS

| | | | |
|---|---|---|---|
| 3,223,777 | 12/1965 | Crawford et al. | 178/5.8 |
| 3,294,903 | 12/1966 | Goldmark et al. | 178/6 |
| 3,448,267 | 6/1969 | Blythe et al. | 244/1 |

*Primary Examiner*—Richard Murray
*Assistant Examiner*—Barry Leibowitz
*Attorneys*—Justin P. Dunlavey and John O. Tresansky

ABSTRACT: The present invention generally relates to a long life television system carried aboard a passively stabilized satellite for continuously providing linearized, high resolution coverage of the earth or other body about which the satellite orbits. More specifically, the proposed system of the present invention operates on a line-scan principle; i.e., the satellite carries a lens system whose field of view is a narrow, elongated swath on the earth's surface which advances due to the satellite orbital motion. A fiber optic assembly receives the light image from the lens system and transfers it, as a substantially square raster, to the photosensitive faceplate of an image dissector camera tube, for example, where the image is then electronically scanned at a rate dependent upon the time that it takes for the satellite's field of view (image swath) to advance a distance corresponding to the width of one resolution element of the image dissector. The resulting output video information from the image dissector camera tube is then encoded, along with satellite altitude information, onto a transmitted carrier frequency. At the ground receiving station, the video information is decoded and is then transformed, by suitable electro-optical transducer means, into a visual display on a drum recorder or a cathode ray oscilloscope, for example. The proposed television system of the present invention also includes means for compensating or rectifying the video display to account for curvature of the earth.

IRVIN H. SCHROADER
GEORGE B. BUSH
CHARLES J. SWET
THEODORE WYATT
INVENTORS

BY J. O. Tresansky
ATTORNEY

IRVIN H. SCHROADER
GEORGE B. BUSH
CHARLES J. SWET
THEODORE WYATT
INVENTORS

INVENTORS
IRVIN H. SCHROADER
GEORGE B. BUSH
CHARLES J. SWET
THEODORE WYATT

IRVIN H. SCHROADER
GEORGE B. BUSH
CHARLES J. SWET
THEODORE WYATT
INVENTORS

TELEVISION SATELLITE SYSTEM

BACKGROUND OF THE INVENTION

In recent years, considerable effort has been expended in the search for an operational, satellite-borne television system capable of providing continuous, high resolution television coverage of the earth's surface and/or cloud cover, as the satellite orbits. Obviously, such a television system would have tremendous utility in the field of meteorology, for example.

However, the previously proposed satellite-borne television systems all suffer from serious disadvantages. For example, in the so-called snapshot-type television system, a relatively large scene is presented to the satellite-borne camera tube all at one time, so that resolution at the camera tube is a limitation. Moreover, many of the previously proposed satellite television systems require storage of the video information aboard the satellite and require readout command signals from the ground; i.e., such systems do not present the video data to the ground station in real time.

Another serious disadvantage with previously proposed satellite television systems is that they have short operating lifetimes. This is due primarily to the fact that they utilized so-called hot cathode-type camera tubes such as the vidicon or image orthicon which are most favorably rated at approximately 1,000 hours. Along these lines, furthermore, the manner in which the previously proposed television satellites were stabilized, to permit proper television picture taking, often required the use of an active type stabilization system which had a relatively short operating life, inasmuch as it required the expenditure of some sort of fuel.

Moreover, many of the previously proposed television satellite systems required relatively complex electronic circuitry aboard the satellite, particularly for the readout scanning of the video information from the camera tube and/or large transmission bandwidths were needed for the satellite-ground communication of the resultant video data.

DESCRIPTION OF THE INVENTION

In view of the foregoing, it is proposed in accordance with the present invention to provide a satellite-borne television system having a long operating life and which operates on a line-scan principle; i.e., the satellite-borne camera tube is continually exposed, by means of a lens system and folded fiber optics, to a long, narrow swath of the earth's surface which is advanced as the satellite moves in orbit. This greatly reduces the amount of scene presented to the camera tube, at any given time, and thus results in output video information having much finer resolution. In accordance with the present invention, the image scanning circuitry associated with the camera tube operates to electronically scan the input image from the camera tube's photosensitive faceplate at a rate corresponding to the time required for the satellite's field of view to advance one swath width, so that the resulting high resolution video information is available at the camera tube continuously, in real time.

It is also proposed in accordance with the present invention, that an image dissector be employed as the satellite-borne television camera tube. The image dissector tube, when compared to the previously used camera tubes such as the vidicon or image orthicon, is particularly adapted to television satellite use because: it requires not hot filament and therefore has a much longer operating lifetime (better than 1 year as compared with about 1,000 hours); it has a wider dynamic range and needs no shutter; and, it is better suited for operation at the relatively low scanning rates desired in a line-scan system. These features of the image dissector make this type of camera tube especially attractive for inspace use and particularly when it is combined with; i.e., is mounted on, a satellite that is stabilized in a passive manner, for example by gravity gradient stabilization, and thus itself has a longer operating life expectancy. However, it should be understood at this time that many of the novel features of the present invention can be achieved utilizing photosensors other than an image dissector.

In view of the foregoing, one object of the present invention is to provide an improved satellite-borne television system.

Another object of the present invention is to provide an improved line-scan satellite television system capable of producing continuous, high resolution coverage of the earth's surface and/or cloud cover.

Another object of the present invention is to provide a satellite-borne television system having a long operating life expectancy, attained by mounting an image dissector type camera tube on a passively stabilized satellite.

Another object of the present invention is to provide a line-scan satellite television system capable of transmitting high resolution video data, in real time, to a ground receiving station where the video data is reconstructed into a visual display of the continually advancing field of view of the orbiting satellite.

Other objects, purposes and characteristic features of the present invention will in part be pointed out as the description of the invention progresses and in part be obvious from the accompanying drawings, wherein.

Figure 1:
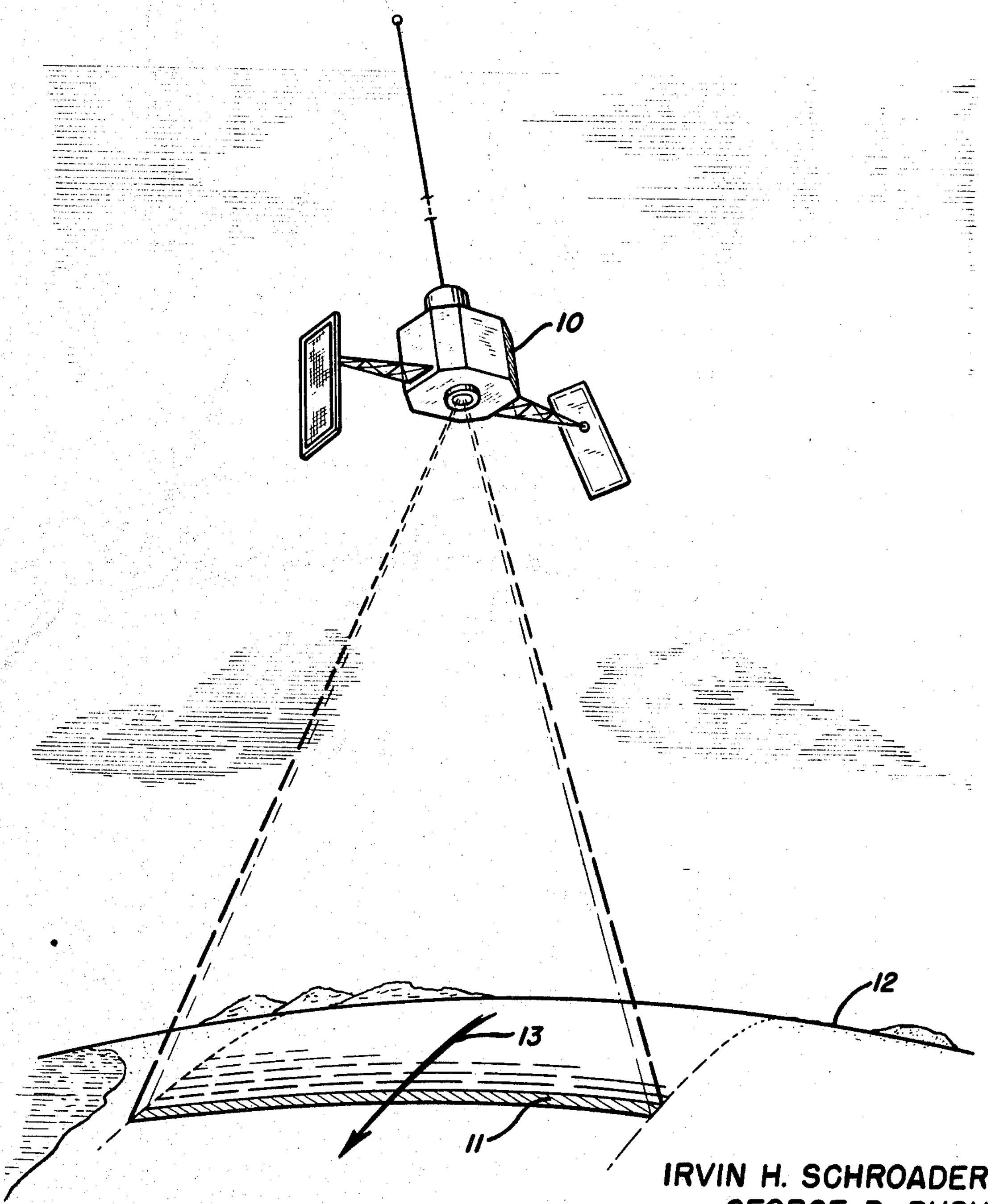
FIG. 1 is a pictorial illustration of a typical earth satellite, as it orbits the earth and assumed here to be carrying apparatus embodying the line-scan television system of the present invention.

Referring now to FIG. 1, the television system of the present invention is preferably mounted on a passively stabilized satellite 10, in such a manner that the field of view of the satellite-borne television camera is a narrow, elongated swath of the earth's surface, such as that designated at 11. By way of illustration, a representative image swath might be approximately 1,900 miles long and 0.5 miles wide; with the 0.5 mile swath width corresponding to the projection on the earth's surface of one resolution element of the satellite carried camera tube. In other words, the size of the image swath 11, selected in practice, depends upon the resolution capabilities of the camera tube carried in the satellite 10. As will be described in more detail hereinafter, as the satellite 10 orbits the earth 12, with its suborbital track represented at 13, the satellite-borne television camera tube is exposed to and operates to scan successive image swaths. This so-called line-scan principle of operation of the present invention greatly improves upon the previously used snapshot method of obtaining television coverage, mainly for the reason that the camera tube has a smaller total scene, at any one time, and is therefore able to provide better picture resolution.

Figure 2:
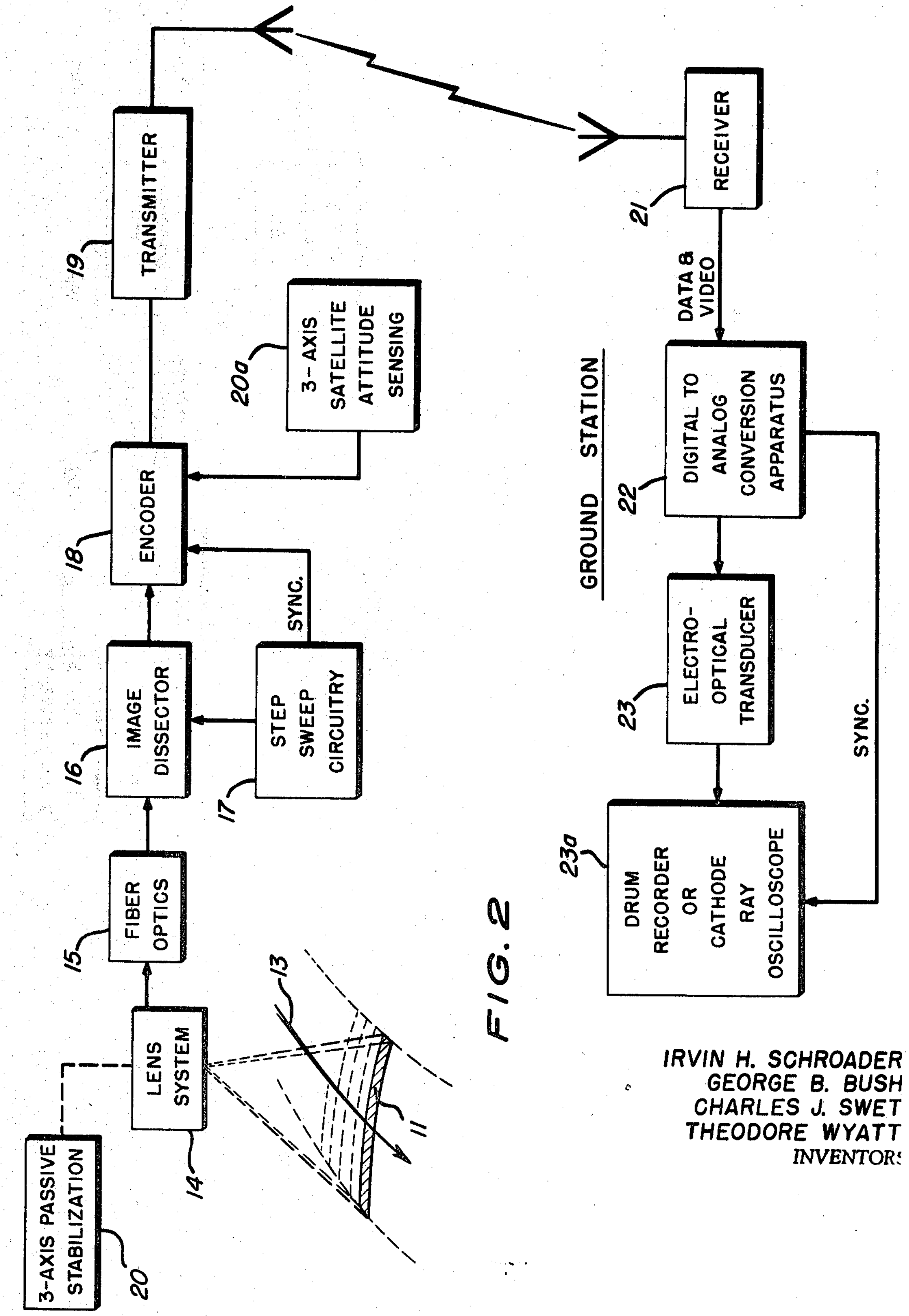
FIG. 2 is a simplified block diagram of one embodiment of the satellite television system proposed in accordance with the present invention.

Referring now to the block diagram of FIG. 2, the satellite-borne television system of the present invention more particularly includes a lens system 14, comprising one or more lenses, which views or "looks at" the continually advancing image swath, as the satellite 10 orbits about the earth, and focuses it, as a line one resolution element wide and $n$ resolution elements long, onto fiber optics 15. As will be explained in more detail hereinafter, the fiber optics 15 are arranged as an array which transfers the line image, as a substantially square raster having $\sqrt{n}$ resolution elements on a side, to the photosensitive faceplate of the image dissector camera tube 16.

As previously discussed, the proposed use of the image dissector camera tube 16 is particularly attractive, not only because the image dissector has no shutter and therefore can be exposed continuously; but, also because its simple construction and lack of filament make it an inherently reliable and long-lived device; its high linearity over a wide dynamic range eliminates the need for inspace gamma or contrast correction; and, by employing the fiver optics 15 to make a line-to-raster transformation of the input image, the resolution of the image dissector is effectively multiplied many times.

Step sweep circuitry 17, which may be of conventional design, is associated with the image dissector 16 and functions to electronically scan the input image raster from the faceplate of the camera tube 16, in synchronism with the movement of the satellite's field of view across the earth's surface. More specifically, the step sweep circuitry 17 scans an image raster at such a rate that the raster is completely scanned (video readout) in the time that it takes for the satellite's field of view to move one swath width.

The step sweep circuitry 17 thus operates to produce continuous, serial readout of video information from the image dissector 16, which is fed to suitable encoder circuitry 18, along with a synchronizing signal from the circuitry 17 and satellite altitude information derived from suitable sensing equipment carried aboard the satellite 10. The encoder unit 18 operates in a conventional manner to modulate or encode a suitable carrier frequency with its input video, sync and attitude data and its output is coupled to a suitable carrier transmitter 19 which transmits the coded carrier signal to suitable ground receiving apparatus also shown in FIG. 2.

As previously mentioned, it is proposed in accordance with the present invention that the satellite 10 which carries the illustrated television apparatus of FIG. 2 be stabilized, along each of its three major axes, in a passive manner. For this purpose, the satellite-carried apparatus of FIG. 2 includes satellite stabilization or altitude control means 20 which, by way of example, might provide gravity gradient stabilization of the satellite, in a manner disclosed in the U.S. Pat. No. 3,282,532 to B.E. Tinling et al. The residual errors of the stabilization are then monitored by the attitude detector assembly **20*a***.

The typical ground station includes a suitable receiver 21 which receives the coded carrier signal and feeds the video data to a digital to analogue conversion unit 22, which may also be of conventional design, where the video information is decoded for subsequent display. More specifically, the D/A unit 22 converts the received digitized video information into an equivalent analogue signal which is, in turn, fed to an electrical-optical transducer 23 which reconstructs the original light image (scene from the earth's surface) from the decoded video signal. By way of example, the transducer unit 23 might simply be a lamp whose output light intensity is varied by the analogue video output signal from the D/A conversion unit 22. The output of the transducer 22 is then applied to a suitable display means **23*a* which might be a drum recorder or a cathode ray oscilloscope and which is kept synchronized with the scanning of the image dissector 16, to faithfully reproduce or reconstruct a visual display of the continuously advancing image swath 11**.

As mentioned previously, the coded telemetry signal received at the ground station of FIG. 2 also includes altitude information indicative of the satellite's altitude relative to the earth, for example. This altitude data enables the ground equipment and/or operator to properly correlate the visual display provided by display means **23*a* with the attitude of the satellite 10**.

Figure 3:
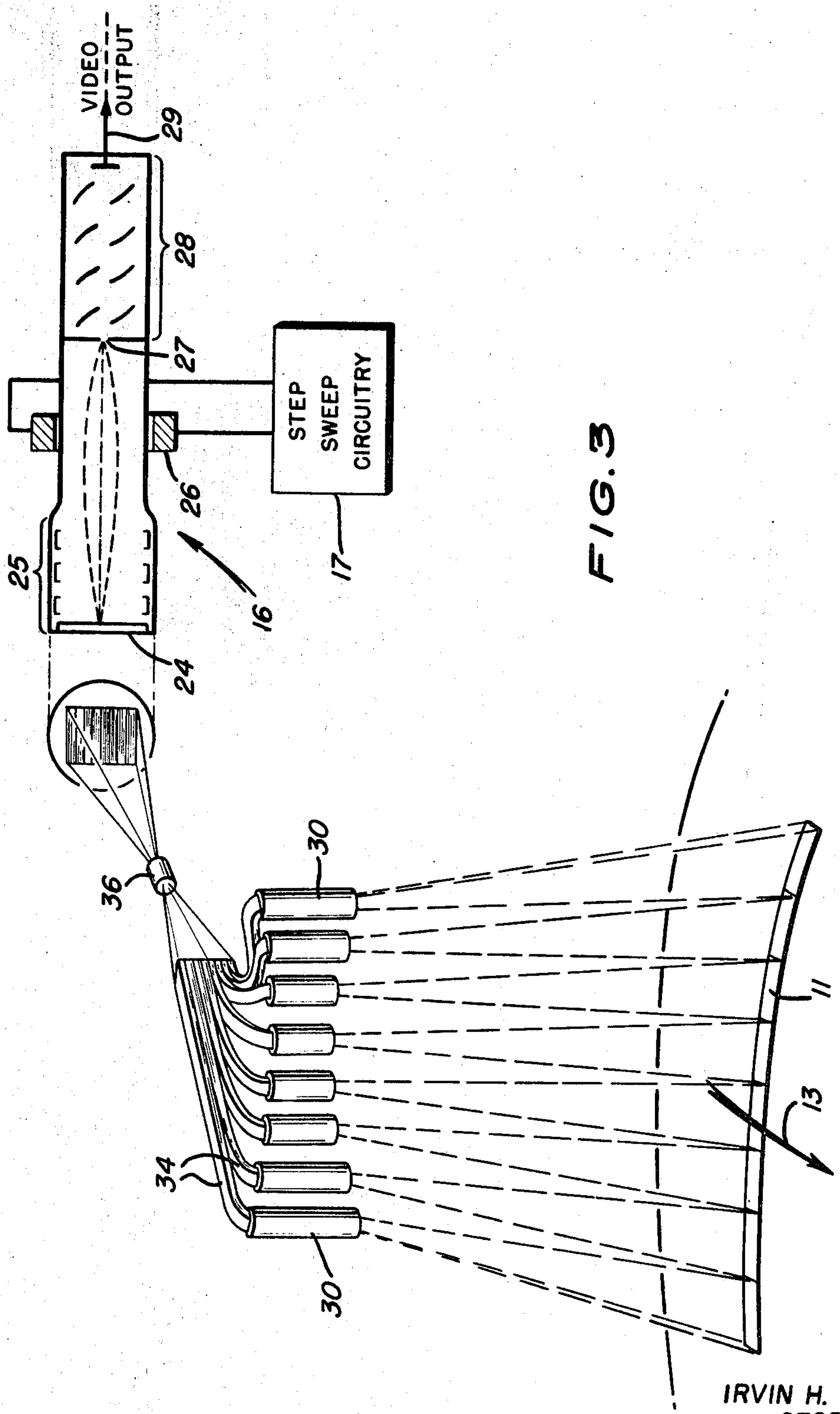
FIG. 3 illustrates schematically an image dissector type camera tube forming part of the television system of the present invention and also showing one embodiment of the lens system and fiber optics assembly employed ahead of the camera tube.
Figure 4:
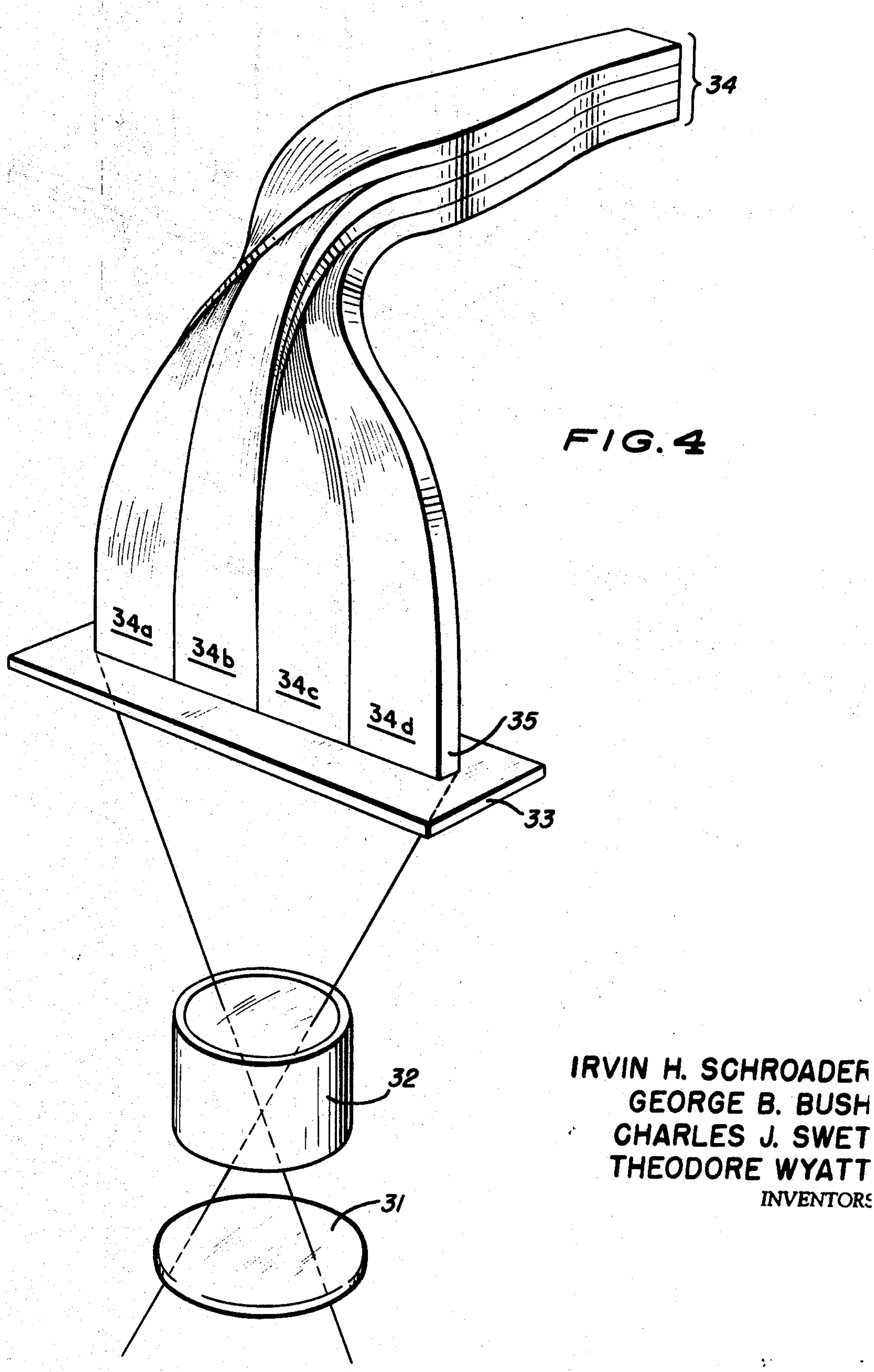
FIG. 4 is a detailed perspective view of the fiber optics assembly and lens system, slightly modified from that shown in FIG. 3.

A more detailed showing of the satellite-carried lens system and fiber optic apparatus employed to project the earth's image swath 11 as input to the image dissector camera tube 16 is illustrated at FIGS. 3 and 4 of the drawings. Referring now to FIG. 3, a typical image dissector camera tube 16 is shown and includes a photosensitive faceplate 24; focusing and acceleration optics 25; a deflection coil 26; a mechanical aperture 27; and, an electron multiplier section 28. When a light image impinges upon the photosensitive faceplate (photocathode) 24, electrons are emitted from the various regions of the faceplate 24, in proportion to the light image intensity at those regions, and are subsequently focused and accelerated rearwardly (to the right) in the image dissector 16, by the focus and acceleration optics 25. The voltage applied to deflection coil 26 then controls the deflection of these electrons towards the aperture 27 and the electron multiplier section 28. In other words, the deflection voltage applied to the coil 26 is capable of scanning the input light image applied to the faceplate 24, as desired, and thereby produce a current, at output 29, proportional to the light image intensity at the various regions of the photosensitive faceplate 24.

In accordance with the present invention, the swath image 11 is applied to the faceplate or photocathode 24 of the image dissector 16 as a substantially square raster having a preselected number *n* of optimum resolution elements on a side. More specifically, in the illustrated embodiment of the present invention shown in FIG. 3, the image swath 11 is divided into a plurality of equal length segments (each 240 miles long, for example) by a corresponding plurality of lens units 30; each of which includes (see FIG. 4) a suitable filter 31, a lens 32, and a masked slit member 33 to which is attached a group of optical fiber subbundles, designated at **34*a—d*, The width of the slit 35 in the masked member 33 in such that the light image transferred to the optical fibers 34 represents a narrow slice of the earth's surface; i.e., the image swath 11**, one resolution element wide and a predetermined number *n* of resolution elements long. In practice, it has been observed that making each slit 35 cover approximately 512 resolution elements, with 128 resolution elements assigned to each of the four illustrated subbundles of optical fibers 34, functions satisfactorily. The filter 31 preferably has a cutoff wave length near 550 millimicrons to reduce the well-known Rayleigh scattering energy to a suitable value, in order to avoid interference with the incoming light image 11. As shown in FIG. 4, the fiber optic bundles **34*a*—34*d* are aligned, at one end, with the slit 35 and are configured such that their extending ends lie underneath one another, to form the substantially square array raster. Moreover, for reasons to be described in detail hereinafter, the bundles 34*b* and 34*d*** are each provided with a half-twist.

It should be noted in FIG. 3 that the lens units 30 are illustrated as having different lengths. This is intended to represent that the lenses 32 contain therein have different focal lengths; i.e., with the shortest focal length lens being that which views the middle of the image swath 11, for the purpose of rectifying or linearizing the image swath 11 to account for the distorting effect of the curvature of the earth towards the ends of the image swath 11. Another possible method of accomplishing this mapping rectification is by appropriately tapering the optical fibers. Still another manner of accomplishing this mapping rectification is to vary the spacing of the extending ends of the optical fibers. In any event, the result to be attained is that each segment of the image swath 11 will be projected on the image dissector 16 as an image line of the same length. One great advantage of performing this mapping rectification in one of these proposed passive manners; i.e., by varying lens focal length and/or optical fiber spacing or diameter, is that such rectification need not be performed actively, by electronic circuitry. Consequently, the electronics aboard the satellite are less complex and the required telemetry bandwidth is materially reduced.

As shown in FIG. 3, the output light image raster from the fiber optics assembly 15 is transferred, by means of a transfer lens 36 to the photosensitive faceplate or photocathode 24 of the image dissector tube 16. The step sweep circuitry 17, of FIG. 2, then varies the control voltage applied to the camera tube's deflection coil 26 and thereby causes the input light image raster to be read or scanned from the faceplate 24, to produce the corresponding video output signal 29. More specifically, with the optical fibers of each bundle 34 configured as shown in FIG. 4, the input image raster lines can readily be scanned in alternate directions (to avoid "dead" flyback time) corresponding to motion from one end to the other of said image swath 11; i.e., the video output 29 is read out serially. Preferably, the scanning rate for the step sweep circuitry 17 is such that the satellite's field of view will advance one swath width in the time that it takes to scan or read an input light image raster from the photocathode 24 of the image dissector 16.

From the foregoing description, it should be specifically noted that the proposed system of the present invention has greatly improved picture resolution, inasmuch as the long, narrow image swath is converted into a raster at the camera tube. In other words, better use is made of the resolution capabilities of the camera tube.

Many modifications, adaptations and alterations of the present invention, in addition to those pointed out above, are possible in the light of the above teachings. For example, the proposed television satellite system is not limited to any specific image swath size and, if desired, the plurality of lens units 30 shown in FIG. 3 of the drawings can be replaced by a single, wide-angle lens providing the input of the fiber optics be arranged along the focal surface thereof. Also, the satellite may include means for temporarily storing of the video information, if desired. It is therefore to be understood at this time that within the scope of the appended claims, the invention may be practiced otherwise than as specifically described.

We claim:

1. In a satellite-borne television system, the combination comprising:

means for stabilizing the three major axes of said satellite relative to the object about which said satellite orbits;

photosensor means having a photosensitive image input surface;

a lens system for viewing an elongated image swath on the surface of said object perpendicular to the suborbital track of said satellite and capable of dividing said image swath into a plurality of substantially equal resolution elements;

fiber optic means operably connected between said lens system and said photosensor means for transferring said divided image swath as a substantially square raster to the photosensitive image input surface of said photosensor means;

means for rectifying the image swath transferred to said photosensor means so as to minimize distortion of said image at the ends of said swath due to curvature of the object about which said satellite orbits;

circuit means operably connected to said photosensor means for scanning said image raster to produce an electrical video output signal;

transmitter means for transmitting a carrier signal to a receiving station;

coding means responsive to said video output signal from said photosensor means for coding said carrier signal in accordance with said video signal;

means at said receiving station for receiving and decoding said transmitted carrier signal; and display means operably connected to said receiving means for reconstructing a visual display of said image swath from said decoded video signal.

2. The system as specified in claim 1 wherein said image rectifying means comprises different focal length lenses contained in said lens system and capable of causing all the segments of the image swath to be transferred to the photosensor means as equal length image lines.

3. The system as specified in claim 1 wherein said image rectifying means comprises tapered optical fibers included in said fiber optic means for providing increased magnification towards the ends of said image swath.

4. The system specified in claim 1 wherein said photosensor means is an image dissector camera tube.

5. The system specified in claim 1 wherein said satellite stabilizing means provides gravity gradient stabilization of said satellite.

6. The combination specified in claim 1 wherein:

said photosensor means operates with a predetermined optimum resolution element;

said fiber optic means includes a plurality of optical fiber bundles having one end disposed in alignment to receive light corresponding to a swath image segment and being configured to convert said image segment into a plurality of spaced-apart parallel image lines on the photosensitive image input surface of said photosensor means; and said lens system includes means for imaging said swath image segment as a line one resolution element wide onto the aligned ends of said optical fibers, whereby said fiber optic means transfers said entire image swath to said photosensor means as a substantially square raster of spaced-apart parallel image lines.

7. The combination specified in claim 6 wherein said circuit means scans the parallel image lines of said raster in succession corresponding to movement from one end to the other of said image swath and the time required for scanning said raster is substantially equal to the time in which the field of view of said satellite advances a distance corresponding to the dimension of one resolution element.

8. The combination specified in claim 4 wherein the video output signal from said image dissector is encoded onto said transmitted carrier as it is produced, whereby the receiving station receives said video signal in real time.

9. The combination specified in claim 1 further including:

means for sensing the attitude of said satellite;

means operably connected to said satellite attitude sensing means for coding said carrier signal in accordance with the attitude of said satellite; and means at said receiving station responsive to said attitude information for permitting the correlation of said displayed video signal with the attitude of said satellite.